(12) United States Patent
Kusase

(10) Patent No.: US 9,106,121 B2
(45) Date of Patent: Aug. 11, 2015

(54) DOUBLE-STATOR MOTOR

(71) Applicant: DENSO CORPORATION, Kariya, Aichi-pref. (JP)

(72) Inventor: Shin Kusase, Obu (JP)

(73) Assignee: DENSO CORPORATION, Kariya (JP)

( * ) Notice: Subject to any disclaimer, the term of this patent is extended or adjusted under 35 U.S.C. 154(b) by 225 days.

(21) Appl. No.: 13/954,215

(22) Filed: Jul. 30, 2013

(65) Prior Publication Data

US 2014/0028142 A1 Jan. 30, 2014

(30) Foreign Application Priority Data

Jul. 30, 2012 (JP) .................. 2012-168008

(51) Int. Cl.
| | | |
|---|---|---|
| H02K 1/00 | (2006.01) | |
| H02K 16/04 | (2006.01) | |
| H02K 21/14 | (2006.01) | |
| H02K 21/22 | (2006.01) | |

(52) U.S. Cl.
CPC ............... *H02K 16/04* (2013.01); *H02K 21/14* (2013.01); *H02K 21/222* (2013.01)

(58) Field of Classification Search
USPC ............... 310/112–113, 156.35, 189, 156.53, 310/266, 179–180
See application file for complete search history.

(56) References Cited

U.S. PATENT DOCUMENTS

| | | | | |
|---|---|---|---|---|
| 5,751,089 | A * | 5/1998 | Stridsberg | 310/266 |
| 5,783,893 | A * | 7/1998 | Dade et al. | 310/266 |
| 6,304,010 | B1 * | 10/2001 | Sugiura | 310/49.11 |
| 6,459,185 | B1 * | 10/2002 | Ehrhart et al. | 310/156.45 |
| 7,119,468 | B2 * | 10/2006 | Shkondin | 310/114 |
| 2007/0096574 | A1 * | 5/2007 | Romagny et al. | 310/112 |
| 2008/0246359 | A1 * | 10/2008 | Lee et al. | 310/112 |
| 2011/0285238 | A1 * | 11/2011 | Kusase et al. | 310/156.48 |
| 2012/0200184 | A1 * | 8/2012 | Takeuchi | 310/112 |
| 2013/0099618 | A1 * | 4/2013 | Kusase | 310/156.56 |
| 2014/0159532 | A1 * | 6/2014 | Kondou et al. | 310/156.53 |

FOREIGN PATENT DOCUMENTS

JP 2007-282331 10/2007

* cited by examiner

*Primary Examiner* — Thanh Lam
(74) *Attorney, Agent, or Firm* — Nixon & Vanderhye P.C.

(57) ABSTRACT

A double-stator includes outer and inner stators each having magnetic poles. Outer-stator and inner-stator windings are connected in series in phases, thereby generating winding magnetomotive force. Outer magnets and inner magnets of a rotor are arranged in a rotor core in the circumferential direction, the outer and inner magnets being alternated between a radially outward portion and a radially inward portion, at a pitch equal to that of the poles of the outer and inner stators so as to be magnetized so that a radially outer side thereof will serve as N poles or S poles and that a radially inner side thereof will serve as S poles or N poles. The rotor core includes outer poles formed between the outer magnets circumferentially adjacent to each other in the radially outward portion, and inner poles formed between the inner magnets circumferentially adjacent to each other in the radially inward portion.

6 Claims, 10 Drawing Sheets

FIG.8

|  | ANALYSIS MODEL A | ANALYSIS MODEL B |
|---|---|---|
| NUMBER OF POLES | 16 | 16 |
| OUTER DIAMETER OF OUTER STATOR (mm) | 266 | 266 |
| AXIAL THICKNESS OF STACK OF CORE (mm) | 55.5 | 55.5 |
| NUMBER OF TURNS / POLES / PHASES | 8 | 8 |
| THREE-PHASE LINE VOLTAGE (EFFECTIVE VALUE V) | 200 | 200 |
| PHASE CURRENT (EFFECTIVE VALUE A) | 320 | 320 |
| MAGNET MATERIAL | FERRITE FB13B (TDK CORP.) | FERRITE FB13B (TDK CORP.) |
| MAGNET LENGTH (mm) | 55.5 | 55.5 |
| MAGNET THICKNESS (mm) | 6 | 4 |
| OUTER MAGNET WIDTH (mm) | 35.6 | 35.6 |
| INNER MAGNET WIDTH (mm) | 32 | 32 |
| AMOUNT OF MAGNET IN USE (cc) | 180 | 240 |

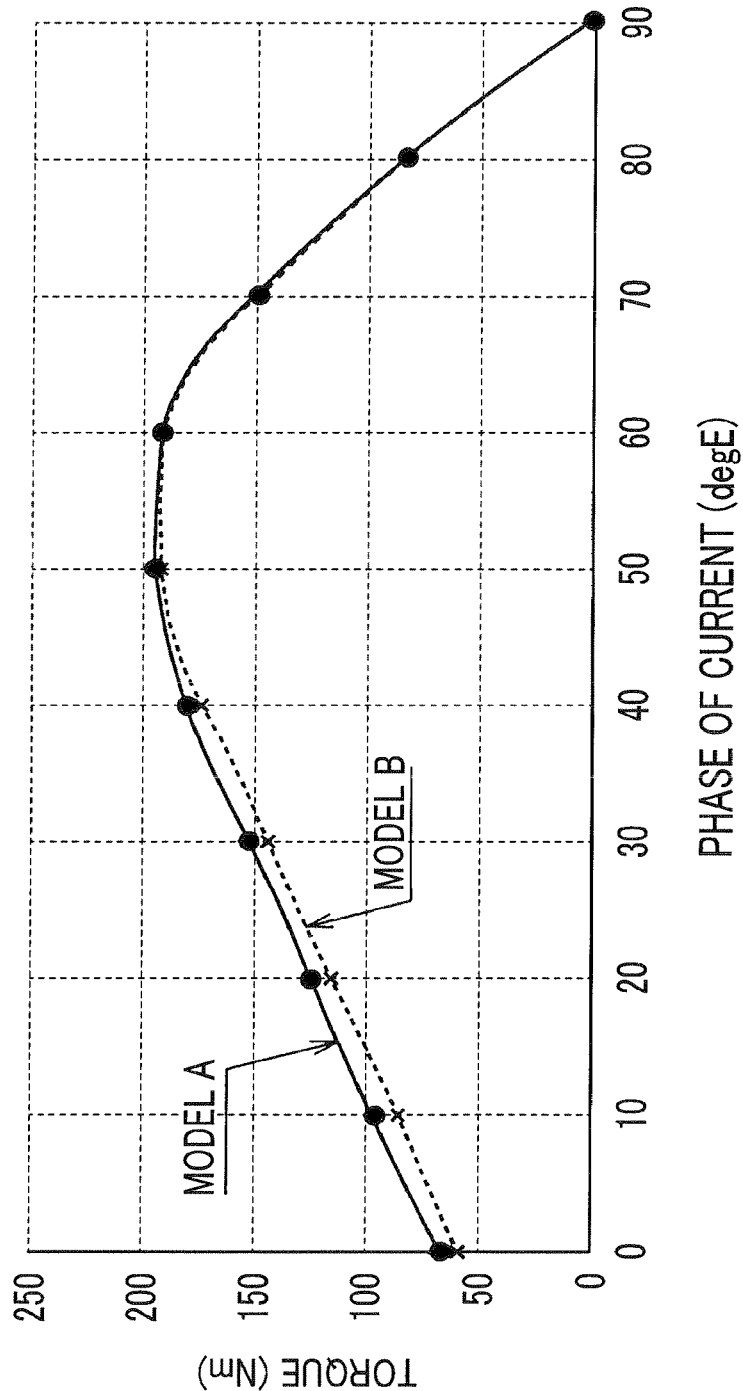

DOUBLE-STATOR MOTOR

CROSS-REFERENCE TO RELATED APPLICATION

This application is based on and claims the benefit of priority from earlier Japanese Patent Application No. 2012-168008 filed Jul. 30, 2012, the description of which is incorporated herein by reference.

BACKGROUND

1. Technical Field

The present invention relates to a high-field motor, such as a vehicle motor, which requires high torque, and more particularly to a double-stator motor configured by arranging an annular rotor in which radially magnetized permanent magnets are each embedded in the center portion of a pole, a three-phase inner stator arranged in a radially inward portion of the rotor and a three-phase outer stator arranged in a radially outward portion of the rotor.

2. Related Art

Mainstream motors in recent years are synchronous motors embedding neodymium magnets as permanent magnets. For such neodymium magnets, a heavy rare earth metal, such as dysprosium, is indispensable as an additive material. However, with the soaring prices of heavy rare earth metals, future use of such rare-earth magnets in mass-produced motors will carry a risk. For this reason, research and development are being accelerated for the production of motors which can reduce use of rare-earth magnets as much as possible.

In particular, in the art of motors for driving vehicles (axle motor, in particular, used in plural numbers), a large torque is desired to be generated using a small-size motor. Therefore, it is very important in the art to provide a motor structure that can exert high resistance against demagnetization as much as possible. Conventional art related to an axle motor can be seen, for example, in the double-stator motor disclosed in JP-A-2007-282331.

A well-known double-stator motor based on conventional art takes a measure against demagnetization by increasing the thickness of each rare-earth magnet that has high resistance against demagnetization. Thus, using a large amount of magnet, sufficient yield strength is ensured in the magnetic field of the stator. However, such a double-stator motor unavoidably increases the number of poles. Moreover, when such a double-stator motor is used as an axle motor, the amount of magnet used for one vehicle becomes extraordinarily large because an axle motor is needed for each of the axles.

SUMMARY

An embodiment provides a double-stator motor in light of the problem set forth above, the double-stator motor being able to reduce the amount of magnet in use and ensure performances equivalent to those of a motor based on conventional art that uses a large amount of magnet.

As an aspect of the embodiment, a double-stator motor is provided which includes: a housing; a shaft which is rotatably supported by the housing; a rotor which is connected to the shaft and rotates integrally with the shaft; an outer stator which is arranged radially outward of the rotor and fixed to the housing, and which has a three-phase outer-stator winding; and an inner stator which is arranged radially inward of the rotor and fixed to the housing, and which has a three-phase inner-stator winding. The outer stator and the inner stator each have magnetic poles, the number of which is the same as that of the rotor, and the outer-stator winding and the inner-stator winding are connected in series in each of the phases, thereby generating winding magnetomotive force so that the magnetic poles, which are radially opposed to each other via the rotor and located at the same circumferential position, come to have the same polarity. The rotor includes: a rotor core which is configured by stacking a plurality of annular core sheets made of a soft magnetic material; a plurality of outer magnets which are embedded in a radially outward portion of the rotor core; and a plurality of inner magnets which are embedded in a radially inward portion of the rotor core. The outer magnets and the inner magnets are arranged in the rotor core in the circumferential direction, the outer magnets and the inner magnets being alternated between the radially outward portion and the radially inward portion, at a pitch equal to that of the poles of the outer stator and the inner stator so as to be magnetized so that a radially outer side thereof will serve as N poles or S poles and that a radially inner side thereof will serve as S poles or N poles. The rotor core includes: a plurality of outer poles which are made of a soft magnetic material and are each formed between the outer magnets circumferentially adjacent to each other in the radially outward portion, and a plurality of inner poles which are made of a soft magnetic material and are each formed between the inner magnets circumferentially adjacent to each other in the radially inward portion.

BRIEF DESCRIPTION OF THE DRAWINGS

In the accompanying drawings:

FIG. 8 is a table listing basic structures of analysis models;

FIG. 9 is a graph comparing performances of the motor according to the first embodiment with those of the motor according to conventional art;

DETAILED DESCRIPTION OF THE PREFERRED EMBODIMENTS

With reference to the accompanying drawings, hereinafter are described embodiments of a double-stator motor of the present invention.

First Embodiment

Referring first to FIGS. 1 to 10, a double-stator motor of the first embodiment is described. In the first embodiment, the double-stator motor is applied, as an example, to a traction motor 1 (hereinafter also just referred to as motor 1) provided between an engine E and a transmission T of a vehicle.

Figure 1:
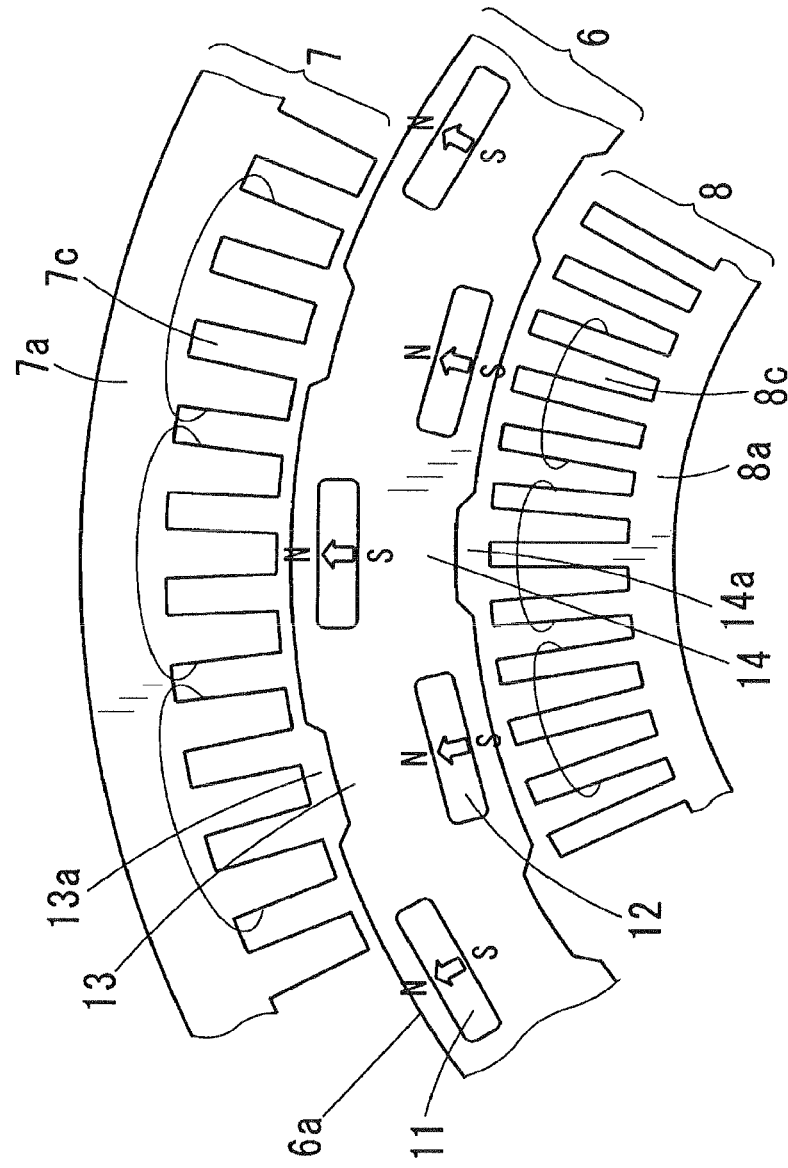
FIG. 1 is a cross-sectional diagram illustrating a part of a motor in a circumferential direction, according to a first embodiment of the present invention.
Figure 2:
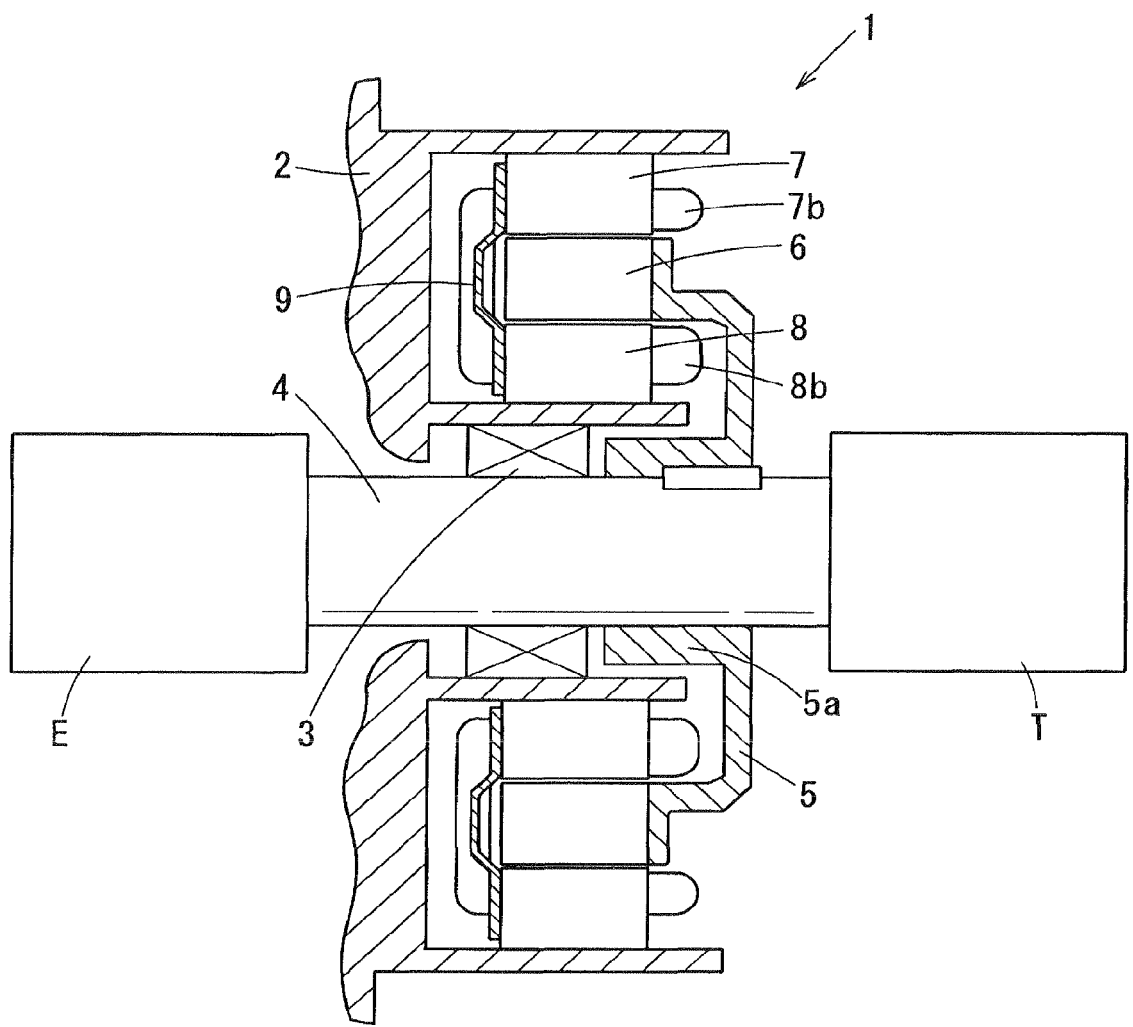
FIG. 2 is a general configuration diagram illustrating the motor.

FIG. 1 is a cross-sectional diagram illustrating a part of the motor 1 in a circumferential direction. FIG. 2 is a general configuration diagram illustrating the motor 1.

As shown in FIG. 2, the motor 1 includes a motor housing 2, a shaft 4, an annular rotor 6, an outer stator 7 and an inner stator 8. The shaft 4 is rotatably supported by the motor housing 2 via a bearing 3, while being connected to a crank shaft of the engine E. The rotor 6 is connected to the shaft 4 via a rotor disc 5. The outer stator 7 is arranged radially outward of the rotor 6 and fixed to the motor housing 2. The inner stator 8 is arranged radially inward of the rotor 6 and fixed to the motor housing 2.

As shown in FIG. 1, the outer stator 7 is configured by an outer stator core 7a and a three-phase outer-stator winding 7b (see FIG. 2). In the outer stator core 7a, a plurality of outer slots 7c are formed in a circumferential direction at a regular pitch. The outer stator winding 7b is wound about the outer stator core 7a through the outer slots 7c.

As shown in FIG. 1, the inner stator 8 is configured by an inner stator core 8a and a three-phase inner-stator winding 8b (see FIG. 2). In the inner stator core 8a, a plurality of inner slots 8c are formed in a circumferential direction at a regular pitch. The inner stator winding 8b is wound about the inner stator core 8a through the inner slots 8c.

As shown in FIG. 2, the outer stator core 7a and the inner stator core 8a of the inner and outer stators 7 and 8 have left-end surfaces, as viewed in the figure, which are fixed to a connecting plate 9 to ensure coaxiality.

The outer stator core 7a is configured by stacking a plurality of annular outer core sheets, each of which is obtained by punching an electromagnetic steel sheet and forming the outer slots 7c therein. Similarly, the inner stator core 8a is configured by stacking a plurality of annular inner core sheets, each of which is obtained by punching an electromagnetic steel sheet and forming the inner slots 8c therein.

Figure 3:
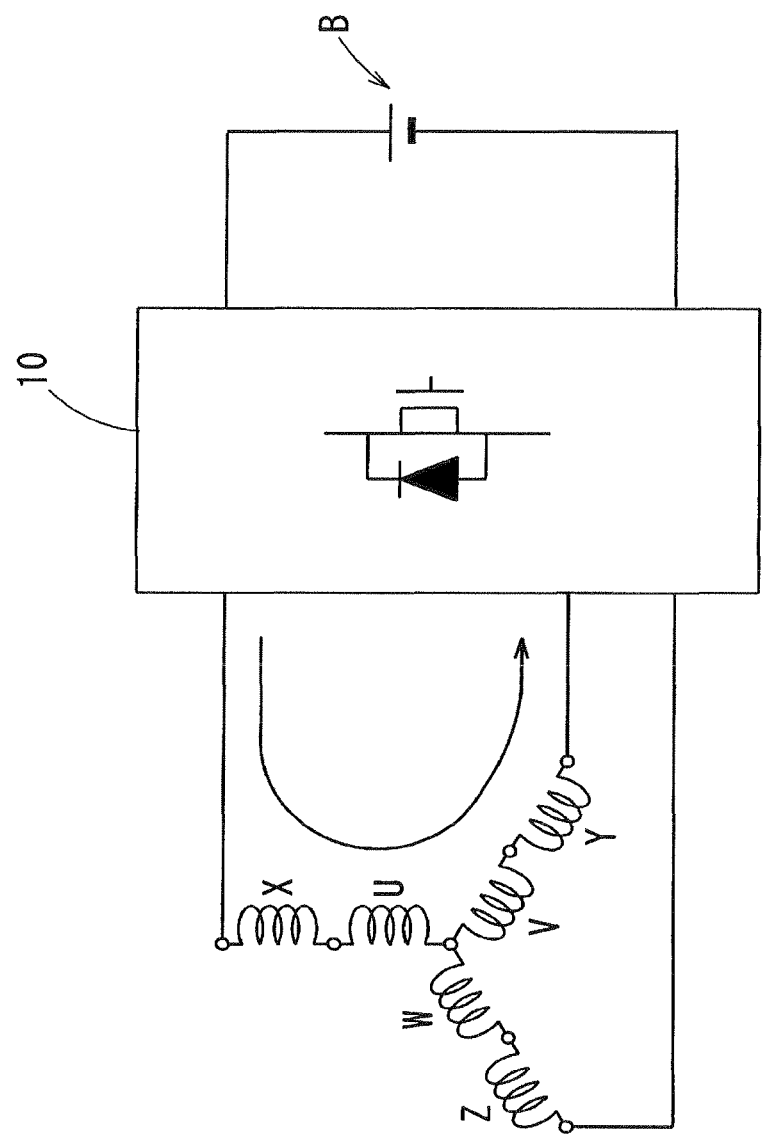
FIG. 3 is a connection diagram illustrating inner- and outer-stator windings of the motor.

FIG. 3 is a connection diagram illustrating the inner- and outer-stator windings 7b and 8b of the motor 1. As shown in FIG. 3, coils are connected in series in each of the phases (X, Y and Z, and U, V and W) to thereby form a star connection. The star connection is connected to a well-known inverter 10.

The inverter 10 is controlled by an ECU (electronic control unit) (not shown) on the basis of information derived from a rotor position sensor (not shown) that detects a rotational position of the rotor 6. Under the control of the ECU, the inverter 10 converts power of a DC power supply B into AC power for supply to the outer- and inner-stator windings 7b and 8b.

The outer and inner stators 7 and 8 each have magnetic poles, the number of which is the same as that of the rotor 6. At the same time, when the outer- and inner-stator windings 7b and 8b are excited through the inverter 10, the outer and inner stators 7 and 8 generate winding magnetomotive force. As a result, the magnetic poles in the stators 7 and 8, which are radially opposed to each other via the rotor 6 and located at the same circumferential position, come to have the same polarity.

As shown in FIG. 1, the rotor 6 includes a rotor core 6a, a plurality of outer permanent magnets (hereinafter referred to as outer magnets 11) and a plurality of inner permanent magnets (hereinafter referred to as inner magnets 12). The rotor core 6a is configured by stacking a plurality of core sheets, each of which is formed by annularly pressing and punching an electromagnetic steel sheet. The outer magnets 11 are embedded in a radially outward portion of the rotor core 6a so as to go along the outer circumference of the rotor core 6a. The inner magnets 12 are embedded in a radially inward portion of the rotor core 6a so as to go along the inner circumference of the rotor core 6a. The rotor core 6a has an axial end face which is fixed to the rotor disc 5.

It should be appreciated that hatching for indicating a cross section is omitted from FIG. 1 that is a cross-sectional diagram illustrating a part of the outer and inner stators 7 and 8 and the rotor 6 in a circumferential direction.

For example, the rotor disc 5 is made of a non-magnetic SUS material. As shown in FIG. 2, the rotor disc 5 has a radially center portion in which a cylindrical boss portion 5a is provided. The boss portion 5a is fitted to an outer periphery of the shaft 4, and is connected to the shaft 4 (key connection) for detent.

The outer and inner magnets 11 and 12 are ferrite magnets. These magnets are inserted into respective magnet insertion holes which are formed through the rotor core 6a in its axial direction (in the direction in which the core sheets are stacked). As shown in FIG. 1, the outer and inner magnets 11 and 12 are arranged in the rotor core 6a in the circumferential direction, the outer and inner magnets 11 and 12 being alternated (i.e. zigzagged) between the radially outward portion and the radially inward portion of the rotor core 6a, at a pitch equal to that of the poles of the outer and inner stators 7 and 8.

As to the polarity, as shown in FIG. 1, the outer and inner magnets 11 and 12 are all magnetized so that the radially outer side thereof will serve as N poles (or S poles) and that radially inner side thereof will serve as S poles (or N poles).

The rotor core 6a has a plurality of outer poles 13 and a plurality of inner poles 14, both of which are made of a soft magnetic material. The outer poles 13 are each formed between circumferentially adjacent outer magnets 11 in the radially outward portion of the rotor core 6a. The inner poles 14 are each formed between circumferentially adjacent inner magnets 12 in the radially inward portion of the rotor core 6a.

The outer and inner poles 13 and 14 are provided with magnetic cavities 13a and 14a, respectively, so as to be located at a circumferentially center portion of the respective poles. In the magnetic cavities 13a and 14a, magnetic permeability is ensured to be lower than that of the soft magnetic material.

The magnetic cavity 13a has a recessed shape. The shape is formed by recessing the outer peripheral surface of the outer pole 13 radially inward at the circumferentially center portion thereof, the outer peripheral surface being radially opposed to the outer stator 7. Accordingly, the gap formed between each outer pole 13 and the outer stator 7 is larger at the center portion of the outer pole 13, by an amount corresponding to the depth of the magnetic cavity 13a, than at circumferentially lateral portions of the outer pole 13, the lateral portions being positioned laterally with respect to the center portion. The circumferentially lateral portions (portions in which the magnetic cavity 13a is not formed) of each outer pole 13 have an outer diameter equal to that of the portions of the rotor, in which the outer magnets 11 are embedded.

The magnetic cavity 14a of each inner pole 14 has a recessed shape. The shape is formed by recessing the inner peripheral surface of the inner pole 14 radially outward at the circumferentially center portion thereof, the inner peripheral surface being radially opposed to the inner stator 8. Accordingly, the gap formed between each inner pole 14 and the inner stator 8 is larger at the center portion of the inner pole 14, by an amount corresponding to the depth of the magnetic cavity 14a, than at circumferentially lateral portions of the inner pole 14, the lateral portions being positioned laterally with respect to the center portion. The circumferentially lateral portions (portions in which the magnetic cavity 14a is not formed) of each inner pole 14 have an inner diameter equal to that of the portions of the rotor, in which the inner magnets 12 are embedded.

Effects and Advantages of the First Embodiment

The rotor 6 is configured such that the outer and inner magnets 11 and 12 are arranged in the rotor core 6a in the circumferential direction, the outer and inner magnets being alternated between the radially outward portion and the radially inward portion of the rotor core 6a, at a pitch equal to that of the poles of the outer and inner stators 7 and 8. Further, the outer poles 13 made of a soft magnetic material are each formed between circumferentially adjacent outer magnets 11. Similarly, the inner poles 14 made of a soft magnetic material are each formed between circumferentially adjacent inner magnets 12. In other words, the outer and inner magnets 11 and 12 are thinned so that one outer magnet 11 is arranged in every two poles and one inner magnet 12 is arranged in every two poles, with the outer and inner poles 13 and 14 being formed, respectively, in the thinned portions.

When the outer and inner magnets 11 and 12 are thinned so that one outer magnet 11 is arranged in every two poles and one inner magnet 12 is arranged in every two poles, demagnetized field applied to each magnet is intensified compared with a motor based on conventional art. Therefore, each magnet is required to have a large thickness.

Figure 6:
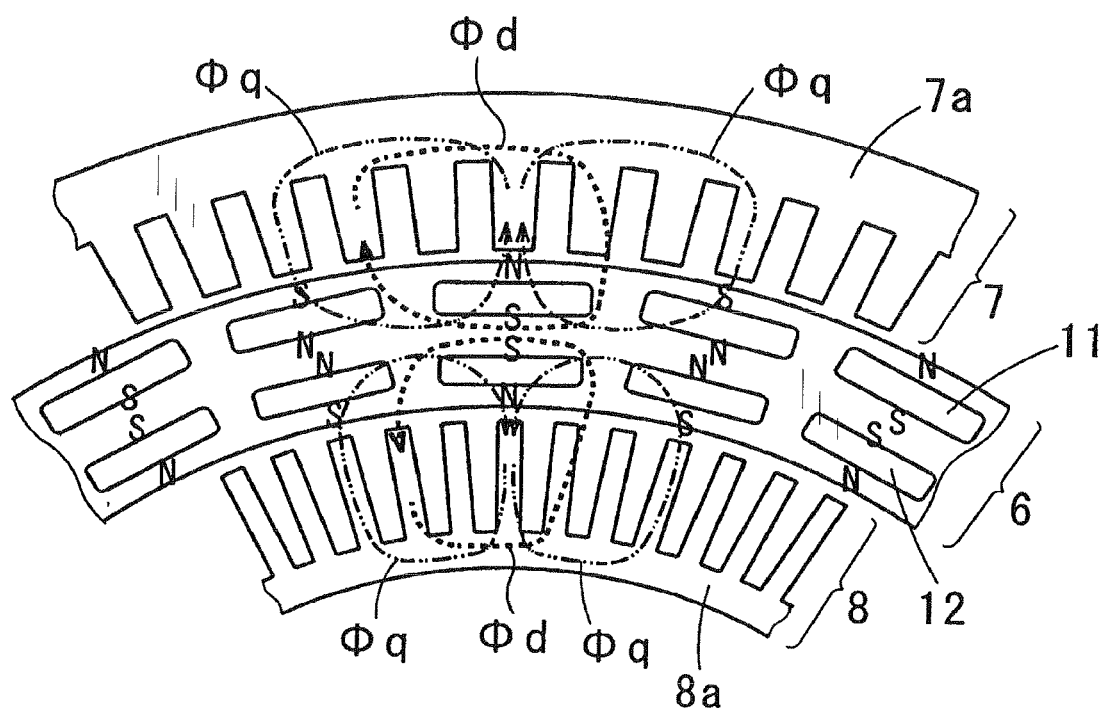
FIG. 6 is a cross-sectional diagram illustrating flows of direct-axis flux and horizontal-axis flux of a motor according to conventional art.

As shown in FIG. 6, a motor based on conventional art has a configuration in which both of the outer and inner magnets 11 and 12 are arranged in every pole of the rotor 6. In such a conventional motor, horizontal-axis flux Φq generated in the outer and inner stators 7 and 8 is applied to two circumferentially adjacent outer magnets 11 and two circumferentially adjacent inner magnets 12, respectively. Also, in such a conventional motor, direct-axis flux Φd generated in the outer and inner stators 7 and 8 has to pass through a narrow soft-magnetic area between the outer and inner magnets 11 and 12, which are arranged at the same circumferential position.

Figure 4:
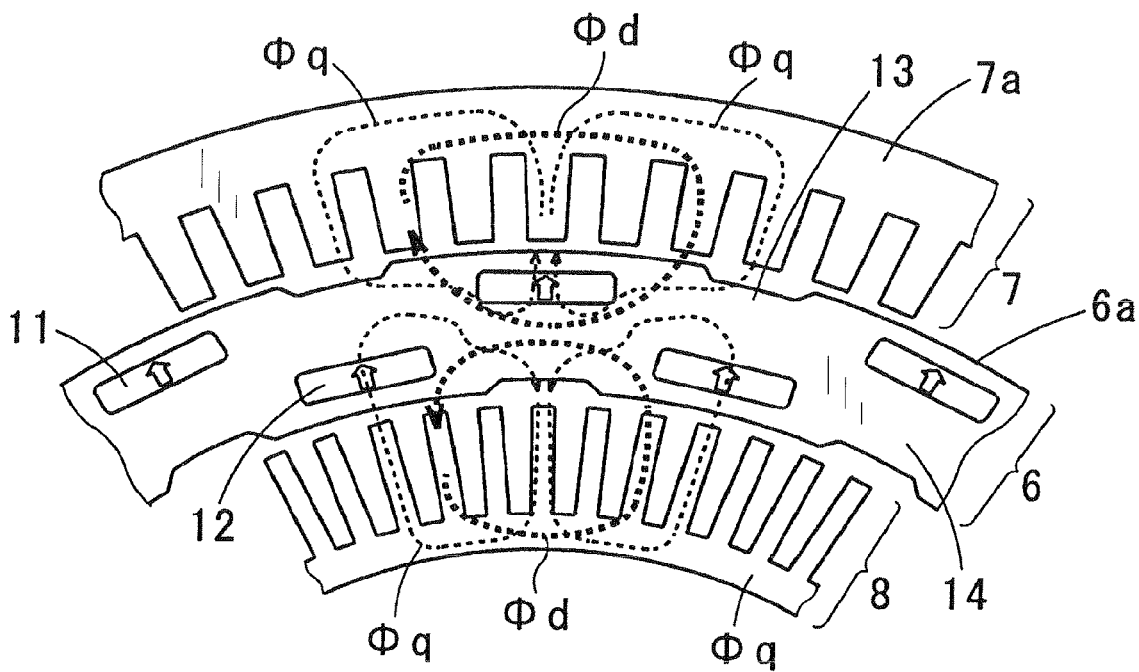
FIG. 4 is a cross-sectional diagram illustrating flows of direct-axis flux and horizontal-axis flux of the motor of the first embodiment.

On the other hand, in the rotor 6 used in the traction motor 1 according to the first embodiment, the outer and inner magnets 11 and 12 are thinned so that one outer magnet 11 and one inner magnet 12 are arranged in every two poles and that the outer and inner magnets 11 and 12 are alternated, with the outer and inner poles 13 and 14 made of a soft magnetic material being formed, respectively, in the thinned regions. With this configuration, as shown in FIG. 4, the horizontal-axis flux Φq easily passes through the soft magnetic regions (outer and inner poles 13 and 14). Accordingly, the horizontal-axis components fields (demagnetized fields) of the outer and inner stators 7 and 8 are weakened to thereby hardly allow demagnetization of the magnets. Thus, the rate of increasing the thickness of each magnet can be made small. In this way, the amount of magnet in use is reduced by arranging one outer magnet 11 in every two poles and one inner magnet 12 in every two poles. Moreover, the effect of suppressing demagnetization exerted by the regions where magnet is thinned can contribute to reducing the amount of magnet.

Further, in the first embodiment, the outer and inner magnets 11 and 12 are arranged zigzag, with one outer magnet 11 and one inner magnet 12 being arranged in every two poles. Thus, compared with the conventional motor shown in FIG. 6, the soft magnetic regions (outer and inner poles 13 and 14), through which the direct-axis flux Φd passes, are ensured to be made larger.

Furthermore, the outer and inner poles 13 and 14 form magnetic cavities 13a and 14a, respectively, at the respective circumferentially center portions to thereby increase the gap formed between the outer and inner stators 7 and 8. Thus, in the field that influences the outer and inner magnets 11 and 12, the direct-axis components field that passes through the center portion of a pole can be weakened. As a result, the yield strength of each magnet against demagnetization is further enhanced. In other words, the stress caused by demagnetization in the magnets is reduced and therefore ferrite magnets having low coercive force can be used instead of rare-earth magnets.

Figure 5:
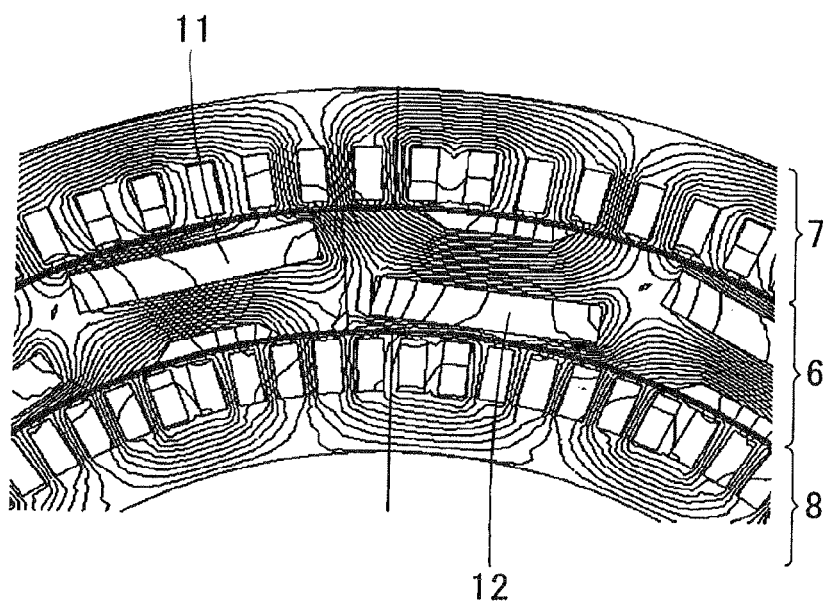
FIG. 5 is a flux-line diagram illustrating a simulation resulting from magnetic-field analysis of the motor.
Figure 7:
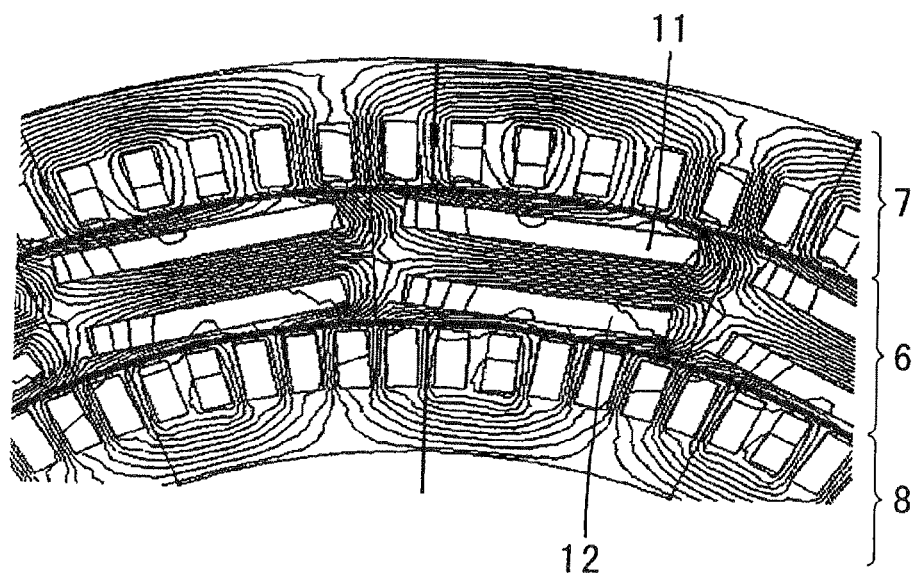
FIG. 7 is a flux-line diagram illustrating a simulation resulting from magnetic-field analysis of the motor according to conventional art.

FIGS. 5 and 7 show results of magnetic-field analyses of the motor 1 according to the first embodiment and a motor according to conventional art, respectively. FIG. 8 is a table listing the basic configurations of the motor 1 (analysis model A) and the conventional motor (analysis model B).

Figure 10:
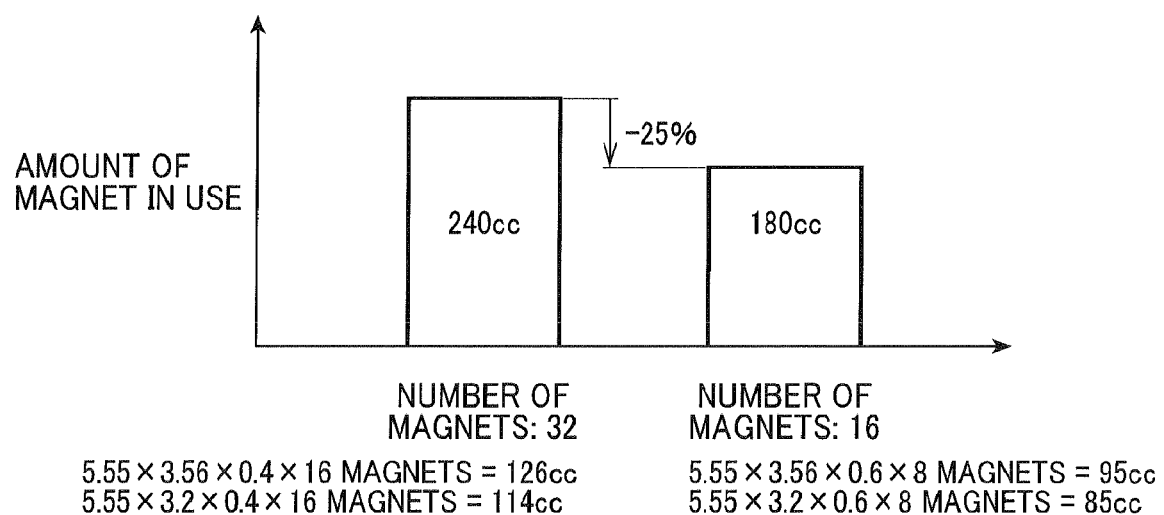
FIG. 10 is a bar graph comparing an amount of magnet of the motor according to the first embodiment with that of the motor according to conventional art.

FIG. 9 is a graph comparing performances of the motor 1 with those of the conventional motor. FIG. 10 is a bar graph comparing an amount of magnet used in the motor 1 to that used in the conventional motor. FIG. 10 shows amount of magnet necessary for the motor 1 and the conventional motor to achieve the respective performances shown in FIG. 9. According to the analyses, as shown in FIG. 10, the motor 1 is expected to exert an effect of reducing an amount of magnet by about 25% compared with the amount of magnet used in the conventional motor.

Further, the motor 1 obtains large torque, as shown in FIG. 9, regardless of using ferrite magnets. Such use of ferrite magnets can eliminate a concern that would be caused by running a risk (quantitative risk or eccentric risk) of using rare-earth magnets.

Second Embodiment

Figure 11:
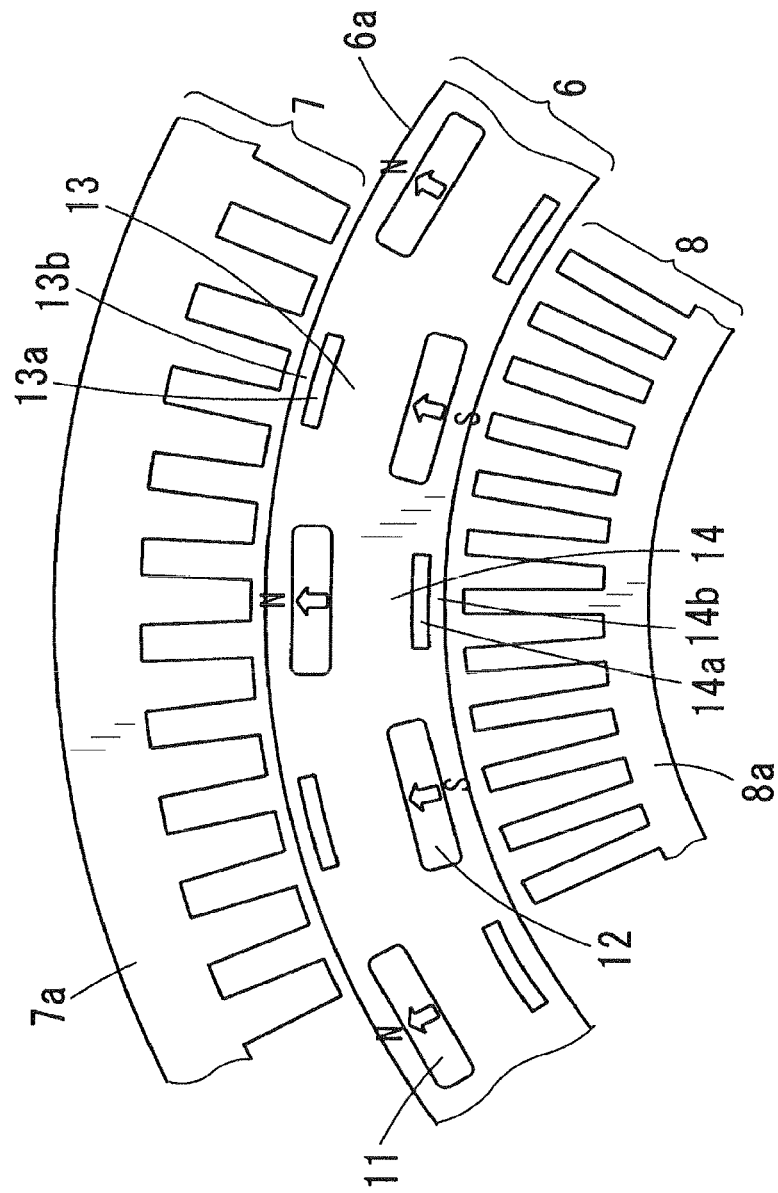
FIG. 11 is a cross-sectional diagram illustrating a part of a motor in a circumferential direction, according to a second embodiment.

Referring now to FIG. 11, hereinafter is described a second embodiment of the present invention. In the second and the subsequent embodiments, the components identical with or similar to those in the first embodiment are given the same reference numerals for the sake of omitting unnecessary explanation.

In the first embodiment described above, the magnetic cavities 13a and 14a of the outer and inner poles 13 and 14, respectively, have a recessed shape. FIG. 11 is a cross-sectional diagram illustrating a part of a motor in a circumferential direction, according to the second embodiment. In the second embodiment, as shown in FIG. 11, the magnetic cavities 13a and 14a formed in the outer and inner poles 13 and 14, respectively, are each formed into a hollow.

Specifically, each outer pole 13 has a hollow serving as the magnetic cavity 13a at a circumferentially center portion of the pole. In a radially outermost portion of the rotor core 6a with respect to the hollow, an outer bridge 13b is formed, being extended in the circumferential direction. Similarly, each inner pole 14 has a hollow serving as the magnetic cavity 14a at a circumferentially center portion of the pole. In a radially innermost portion of the rotor core 6a with respect to the hollow, an inner bridge 14b is formed, being extended in the circumferential direction.

As described above, the magnetic cavity 13a is formed in the outer pole 13. In other words, the radially outward portion with respect to the magnetic cavity 13a is covered with the outer bridge 13b to eliminate the geometric recess in the outer peripheral surface of the rotor 6. Similarly, the magnetic cavity 14a is formed in the inner pole 14. In other words, the radially inward portion with respect to the magnetic cavity 14a is covered with the inner bridge 14b to eliminate the geometric recess in the inner peripheral surface of the rotor 6. For example, when foreign matter enters the motor, the above configuration hardly catches the foreign matter in the important gap between the outer stator 7 and the rotor 6 or between the inner stator 8 and the rotor 6 to thereby enhance safety. Further, the smooth inner and outer surfaces of the rotor 6 can exert an effect of reducing wind noise.

Third Embodiment

Figure 12:
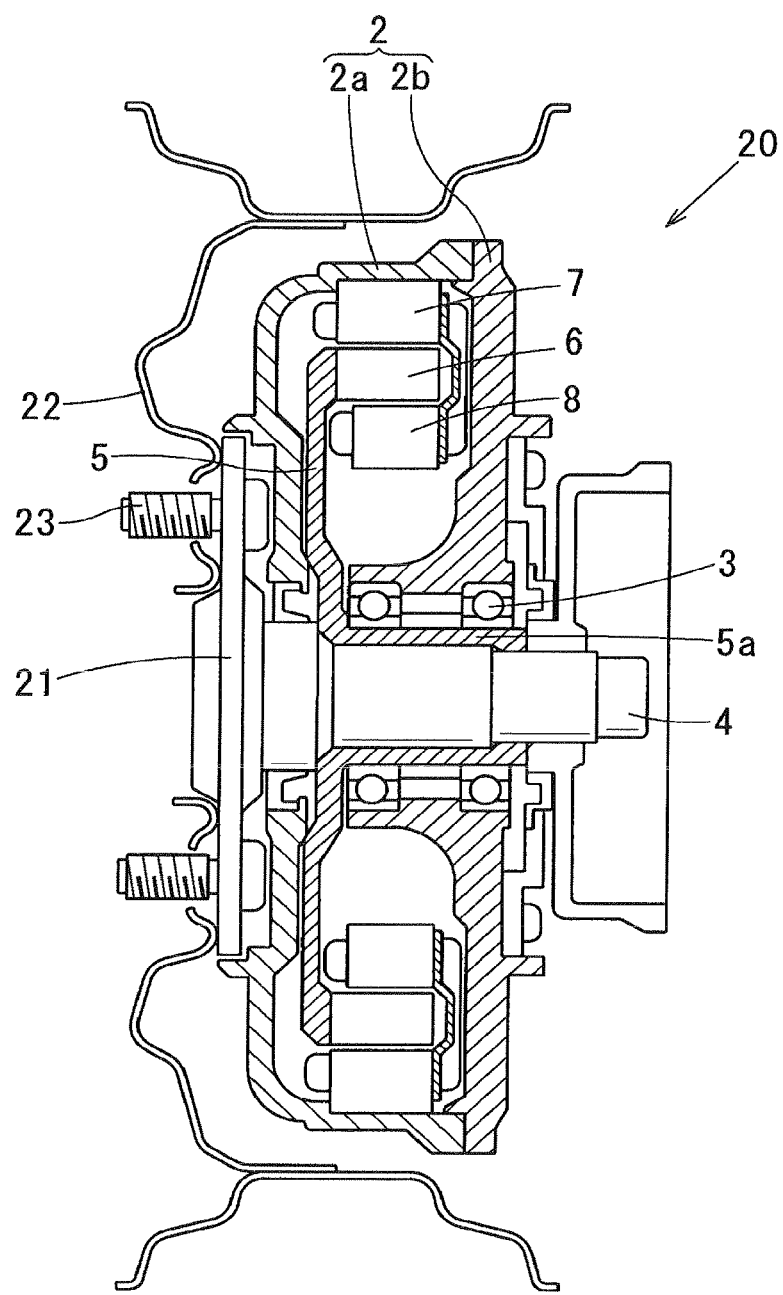
FIG. 12 is a cross-sectional diagram illustrating an in-wheel motor according to a third embodiment.

Referring to FIG. 12, hereinafter is described a third embodiment of the present invention. In the third embodiment, the double-stator motor of the present invention is used, as an example, for an in-wheel motor 20 of an electric car. The in-wheel motor 20 is installed into a wheel of the electric car to directly drive an axle. The configurations of the outer stator 7, the inner stator 8 and the rotor 6 are the same as those of the first embodiment.

FIG. 12 is a cross-sectional diagram illustrating the in-wheel motor 20. As shown in FIG. 12, the in-wheel motor 20 includes a motor housing 2 configured by an outer housing 2a and a rear housing 2b. The motor housing 2 is mounted to the vehicle body via a suspension (not shown). The motor housing 2 has an interior in which the outer stator 7, the inner stator 8 and the rotor 6 described in the first embodiment are arranged.

The motor housing 2 has a center portion through which a hub shaft 4 (axle) is inserted. The hub shaft 4 has an outer periphery to which the boss portion 5a of the rotor disc 5 is fitted in a serrated manner for assemblage. Also, the boss portion 5a of the rotor disc 5 is rotatably assembled to the rear housing 2b via the bearing 3.

The hub shaft 4 has a left end, as viewed in the figure, which is integrally formed with a hub 21. The hub 21 is connected with a wheel 22 via bolts 23.

As described in the first embodiment, the double stator motor of the present invention can reduce the amount of magnet, which would have been necessary to achieve the performances equivalent to the conventional motor. Therefore, the double-stator motor of the present invention can be favorably applied to the in-wheel motors 20 which involve use of the extraordinarily large amount of magnet per vehicle, thereby enhancing reliability of travelling.

(Modifications)

In the first embodiment described above, the rotor 6 uses, as an example, ferrite magnets as the outer and inner magnets 11 and 12. This, however, does not mean that use of rare-earth magnets (e.g., neodymium magnets) is denied. In other words, in the event that rare-earth magnets are used, the amount of magnet in use can be reduced compared with a motor based on conventional art. Therefore, if only a motor has the same structure as that of the traction motor 1 described in the first embodiment, rare-earth magnets (e.g., neodymium magnets) may be used in place of the ferrite magnets to thereby enhance the motor performances.

It will be appreciated that the present invention is not limited to the configurations described above, but any and all modifications, variations or equivalents, which may occur to those who are skilled in the art, should be considered to fall within the scope of the present invention.

Hereinafter, aspects of the above-described embodiments will be summarized.

The double-stator motor (1) includes: a housing (2); a shaft (4) which is rotatably supported by the housing (2); a rotor (6) which is connected to the shaft (4) and rotates integrally with the shaft (4); an outer stator (7) which is arranged radially outward of the rotor (6) and fixed to the housing (2), and which has a three-phase outer-stator winding (7b); and an inner stator (8) which is arranged radially inward of the rotor (6) and fixed to the housing (2), and which has a three-phase inner-stator winding (8b).

The outer stator (7) and the inner stator (8) each have magnetic poles, the number of which is the same as that of the rotor (6), and the outer-stator winding (7b) and the inner-stator winding (8b) are connected in series in each of the phases, thereby generating winding magnetomotive force so that the magnetic poles, which are radially opposed to each other via the rotor (6) and located at the same circumferential position, come to have the same polarity.

The rotor (6) includes: a rotor core (6a) which is configured by stacking a plurality of annular core sheets made of a soft magnetic material; a plurality of outer magnets (11) which are embedded in a radially outward portion of the rotor core (6a); and a plurality of inner magnets (12) which are embedded in a radially inward portion of the rotor core (6a). The outer magnets (11) and the inner magnets (12) are arranged in the rotor core (6a) in the circumferential direction, the outer magnets (11) and the inner magnets (12) being alternated between the radially outward portion and the radially inward portion, at a pitch equal to that of the poles of the outer stator (7) and the inner stator (8) so as to be magnetized so that a radially outer side thereof will serve as N poles or S poles and that a radially inner side thereof will serve as S poles or N poles.

The rotor core (6a) includes: a plurality of outer poles (13) which are made of a soft magnetic material and are each formed between the outer magnets (11) circumferentially adjacent to each other in the radially outward portion, and a plurality of inner poles (14) which are made of a soft magnetic material and are each formed between the inner magnets (12) circumferentially adjacent to each other in the radially inward portion.

Hereinafter, the outer permanent magnets are referred to as outer magnets and the inner permanent magnets are referred to as inner magnets.

In the rotor of the present disclosure, the plurality of outer magnets and the plurality of inner magnets are arranged in the rotor core in the circumferential direction, the outer magnets and the inner magnets being alternated (i.e. zigzagged) between the radially outward portion and the radially inward portion of the rotor core, at a pitch equal to that of the poles of the outer stator and the inner stator. In other words, the outer and inner magnets are thinned so that one outer magnet is arranged in every two poles and one inner magnet is arranged in every two poles, while the outer magnets and the inner magnets are alternated, with the positions being mutually deviated in the circumferential direction by an amount of the pitch of the poles of the outer and inner stators. The outer or inner poles, in which no outer or inner magnet is provided, are formed of a soft magnetic material used for configuring the rotor core.

When the outer and inner magnets are thinned so that one outer magnet is arranged in every two poles and one inner magnet is arranged in every two poles, demagnetized field applied to each of the magnets is intensified. Therefore, each magnet is required to have a large thickness. It is not that a total amount of magnet (the total number of magnets) will be reduced to half by thinning the outer and inner magnets so that one outer magnet is arranged in every two poles and one inner magnet is arranged in every two poles. Nevertheless, this way of arranging magnets can reduce the total amount of magnet compared with a motor based on conventional art, in which outer and inner magnets are both arranged in every one of the poles.

What is important here is that horizontal-axis flux easily passes through the soft magnetic regions (outer and inner poles) where magnets are thinned. This can exert an effect of weakening a horizontal-axis components field (demagnetized field) in the outer and inner stators. For this reason, the magnets are hardly demagnetized, and thus the rate of increasing the thickness of each magnet may be made small. In this way, the amount of magnet is reduced by thinning the outer and inner magnets so that one outer magnet is arranged in every two poles and one inner magnet is arranged in every two poles. Moreover, the effect of suppressing demagnetization exerted by the regions where the magnet is thinned can contribute to reducing the amount of magnet.

Further, a magnetic cavity (13a, 14a) is formed in each of the outer and inner poles (13, 14) formed of a soft magnetic material. Thus, in the field that influences the outer and inner magnets, the direct-axis components field that passes through the center portion of a pole can be wakened. As a result, the yield strength of each magnet against demagnetization is further enhanced.

What is claimed is:

1. A double-stator motor, comprising:
   a housing;
   a shaft which is rotatably supported by the housing;
   a rotor which is connected to the shaft and rotates integrally with the shaft;
   an outer stator which is arranged radially outward of the rotor and fixed to the housing, and which has a three-phase outer-stator winding; and
   an inner stator which is arranged radially inward of the rotor and fixed to the housing, and which has a three-phase inner-stator winding, wherein
   the outer stator and the inner stator each have magnetic poles, the number of which is the same as that of the rotor, and the outer-stator winding and the inner-stator winding are connected in series in each of the phases, thereby generating winding magnetomotive force so that the magnetic poles, which are radially opposed to each other via the rotor and located at the same circumferential position, come to have the same polarity,
   the rotor includes:
   a rotor core which is configured by stacking a plurality of annular core sheets made of a soft magnetic material;
   a plurality of outer magnets which are embedded in a radially outward portion of the rotor core; and
   a plurality of inner magnets which are embedded in a radially inward portion of the rotor core,
   the outer magnets and the inner magnets are arranged in the rotor core in the circumferential direction, the outer magnets and the inner magnets being alternated between the radially outward portion and the radially inward portion, at a pitch equal to that of the poles of the outer stator and the inner stator so as to be magnetized so that a radially outer side thereof will serve as N poles or S poles and that a radially inner side thereof will serve as S poles or N poles, and
   the rotor core includes:
   a plurality of outer poles which are made of a soft magnetic material and are each formed between the outer magnets circumferentially adjacent to each other in the radially outward portion, and
   a plurality of inner poles which are made of a soft magnetic material and are each formed between the inner magnets circumferentially adjacent to each other in the radially inward portion.

2. The double-stator motor according to claim 1, wherein the outer poles and the inner poles are provided with magnetic cavities, respectively, so as to be located at a circumferentially center portion of the respective poles, magnetic permeability of the outer poles and the inner poles being ensured to be lower than that of the soft magnetic material.

3. The double-stator motor according to claim 2, wherein the magnetic cavity has a recessed shape formed by recessing an radially outer peripheral surface of the outer pole radially inward at the circumferentially center portion thereof, and
   the magnetic cavity has a recessed shape formed by recessing an radially inner peripheral surface of the inner pole radially outward at the circumferentially center portion thereof.

4. The double-stator motor according to claim 2, wherein each of the outer poles has a hollow serving as the magnetic cavity at a circumferentially center portion of the pole, and an outer bridge, which is extended in the circumferential direction, formed in a radially outermost portion of the rotor core with respect to the hollow, and
   each of the inner poles has a hollow serving as the magnetic cavity at a circumferentially center portion of the pole, and an inner bridge, which is extended in the circumferential direction, formed in a radially innermost portion of the rotor core with respect to the hollow.

5. The double-stator motor according to claim 2, wherein the outer magnets and the inner magnets are ferrite magnets.

6. The double-stator motor according to claim 1, wherein the double-stator motor is used for an in-wheel motor which is installed into a wheel of an electric car to directly drive an axle of the electric car.

* * * * *